(No Model.)
E. W. GERBRACHT.
APPARATUS FOR VARNISHING WHEELS.
No. 392,325.            Patented Nov. 6, 1888.
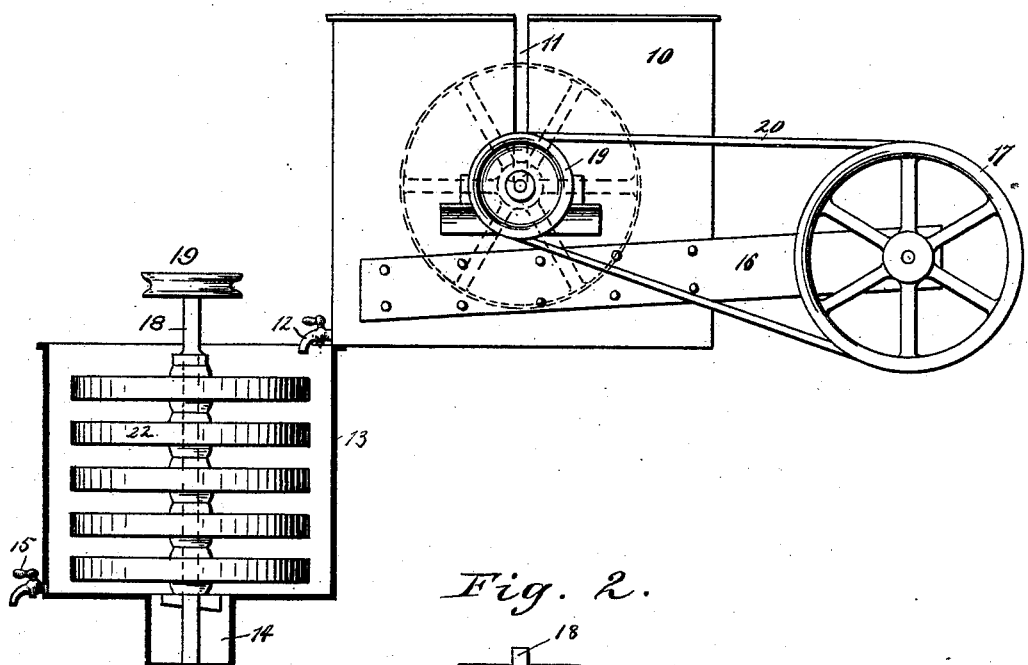
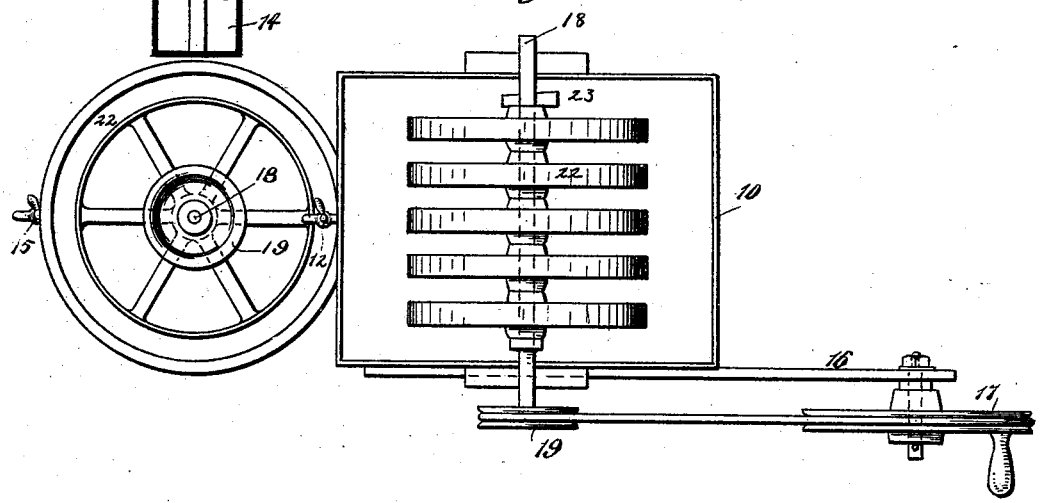
WITNESSES:
INVENTOR:
E. W. Gerbracht
BY Munn & Co.
ATTORNEYS.

UNITED STATES PATENT OFFICE.

ERNEST W. GERBRACHT, OF BROOKLYN, NEW YORK.

APPARATUS FOR VARNISHING WHEELS.

SPECIFICATION forming part of Letters Patent No. 392,325, dated November 6, 1888.

Application filed April 24, 1888. Serial No. 271,688. (No model.)

*To all whom it may concern:*

Be it known that I, ERNEST W. GERBRACHT, of Brooklyn, in the county of Kings and State of New York, have invented a new and Improved Apparatus for Varnishing Wheels, of which the following is a full, clear, and exact description.

My invention relates to an apparatus for varnishing vehicle-wheels, and has for its object to provide a simple, ready, and economical device whereby a number of wheels may be expeditiously varnished at one and the same time.

The invention consists in the construction and combination of the several parts, as will be hereinafter fully set forth, and pointed out in the claim.

Reference is to be had to the accompanying drawings, forming a part of this specification, in which similar figures of reference indicate corresponding parts in both the views.

Figure 1 is a side elevation of the device, one portion of the same being in vertical section; and Fig. 2 is a plan view of Fig. 1.

In carrying out the invention a tank, 10, is supported by any suitable means, and provided upon opposite sides with a vertical slot, 11, extending from the upper edge downward to about the center. The tank 10 is provided with a faucet, 12, at one end near the bottom, which faucet is adapted to project over a second tank, 13, secured partially to the bottom of the aforesaid tank 10, the latter tank being provided centrally upon the under surface with a depression, 14, as best shown in Fig. 1. The tank 13 is likewise provided with a faucet, 15.

To one side of the tank 10 a beam or bar, 16, is attached, projecting outward beyond the rear of the tank, having journaled at its extremity a grooved fly-wheel, 17.

The tank 10 is adapted for the reception of a spindle, 18, which spindle is entered in the slots 11 to a bearing upon the lower wall of the same, and provided at one outer end with a grooved pulley, 19, which pulley is connected with the fly-wheel 17 by a suitable belt, 20.

In operation the tank 13 is filled with varnish or shellac, or with whatever material the wheels are to be coated, and the spindle 18 is detached from the tank 10, and a number of wheels, 22, are placed upon said spindle and held a suitable distance from the ends by means of keys 23 passing through the spindle, or other approved or equivalent devices. The spindle 18, with the wheels thereon, is lifted and plunged into the tank 13, one end of the spindle passing down into the depression 14, the other end of the spindle having the pulley 19 attached being uppermost, as shown in Fig. 1. The wheels are allowed to remain in the bath as long as in practice it may be found desirable, and the spindle is then removed and restored to its normal position in the tank 10. The belt 20 is now passed over the pulley 19, and the fly-wheel 17, which also acts as a pulley, is revolved rapidly, either by hand or from a convenient shaft, as may be desired or found most convenient. The spindle 18 is thus rapidly revolved, and the circular motion imparted to the wheels attached to said spindle causes any surplus varnish to fly off from their peripheries. When the flow of varnish has ceased, the motion of the spindle is stopped, the spindle removed, and the wheels detached therefrom and allowed to dry. Before another set of wheels is placed in position in tank 10 the accumulated varnish is drawn therefrom into the tank 13 through the faucet 12.

Having thus described my invention, I claim as new and desire to secure by Letters Patent—

An apparatus for varnishing wheels, consisting of the varnish-tank 13, provided with a depression, 14, in its bottom, the tank 10, supported in a higher plane than the tank 13, and provided with the slots 11 in its sides and with the faucets 12 for drawing off the accumulated varnish from the tank into the tank 13, the spindle 18, provided with the pulley 19, and adapted to be supported in a vertical position in tank 13 and in a horizontal position in tank 10, the driving-pulley 17, and the belt 20, substantially as described, whereby provision is made for coating a number of wheels with varnish and removing the surplus varnish therefrom, as set forth.

ERNEST W. GERBRACHT.

Witnesses:
J. F. ACKER, Jr.,
EDGAR TATE.